Figure 1:
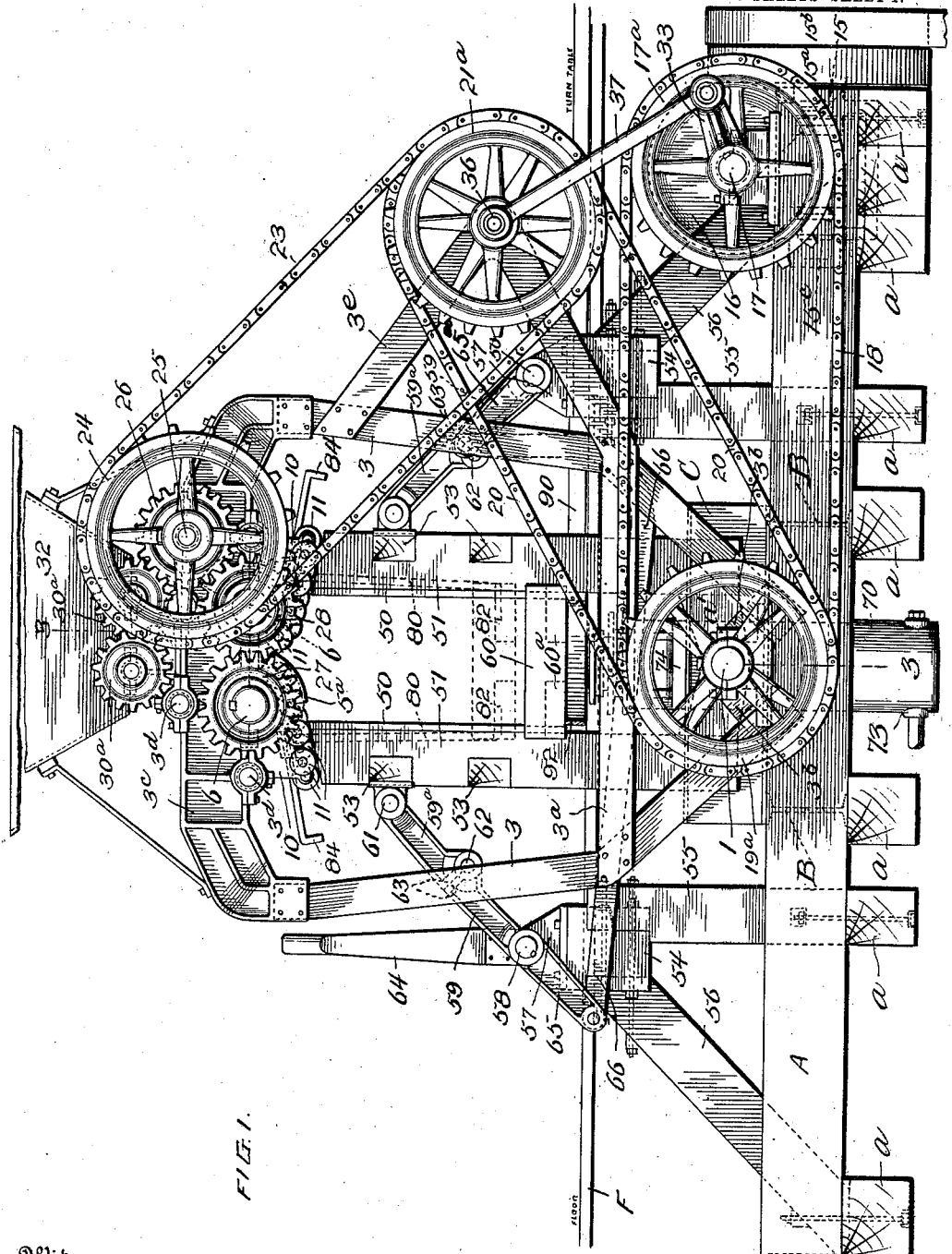

J. N. WOOD.
BALING PRESS.
APPLICATION FILED OCT. 17, 1912.

1,079,683.

Patented Nov. 25, 1913.

6 SHEETS—SHEET 1.

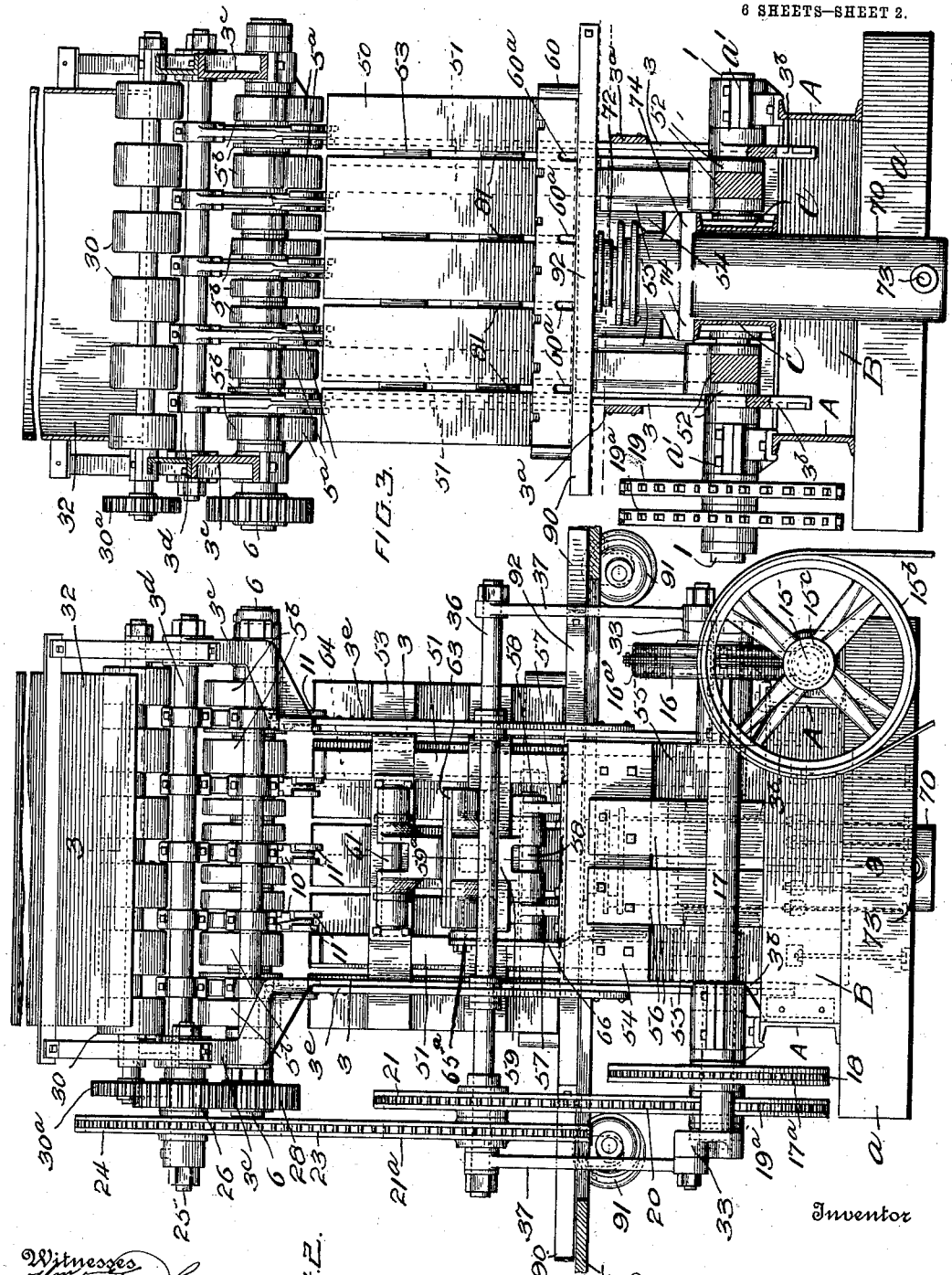

J. N. WOOD.
BALING PRESS.
APPLICATION FILED OCT. 17, 1912.
1,079,683.
Patented Nov. 25, 1913.
6 SHEETS—SHEET 3.
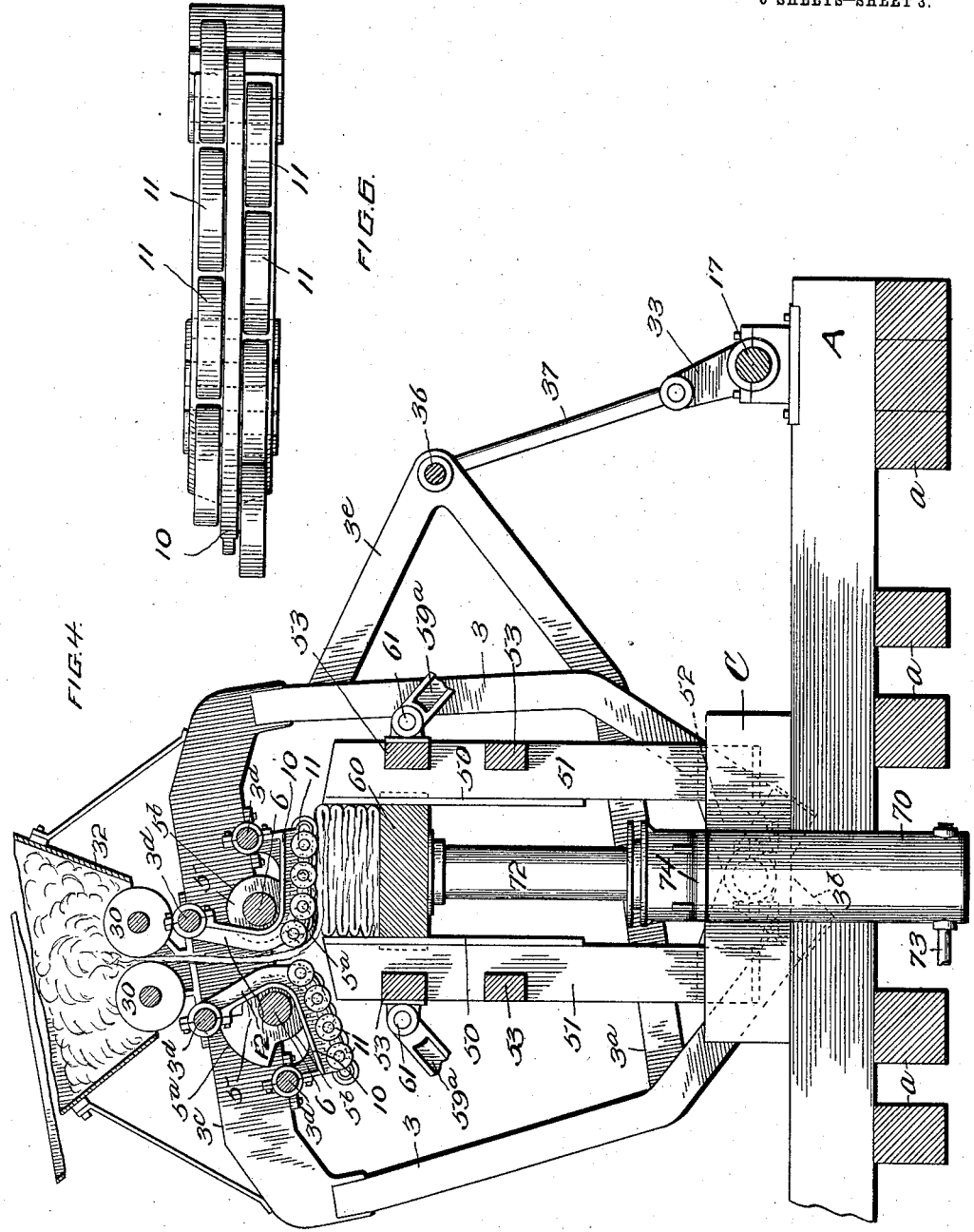

J. N. WOOD.
BALING PRESS.
APPLICATION FILED OCT. 17, 1912.
1,079,683.
Patented Nov. 25, 1913.
6 SHEETS—SHEET 4.
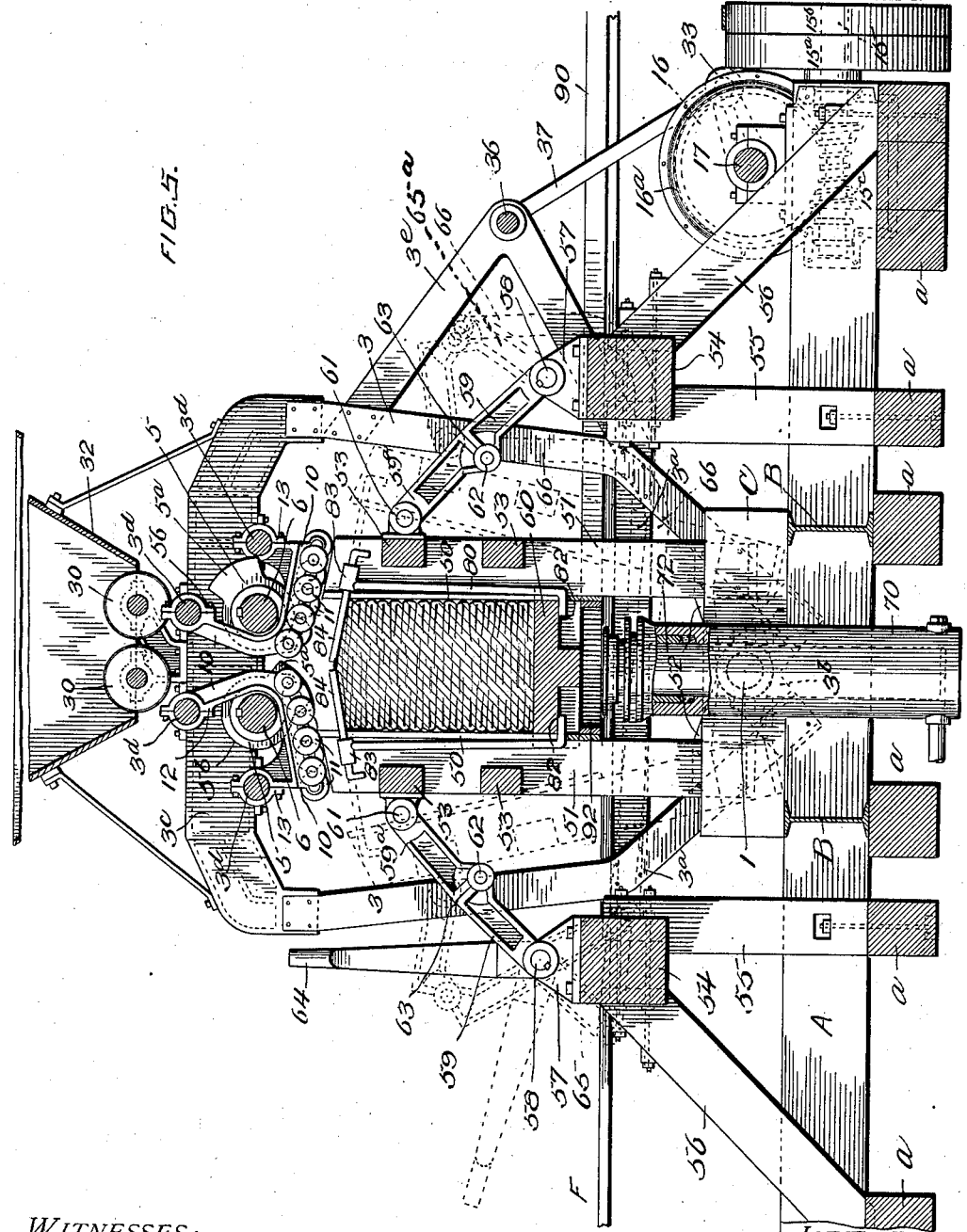
FIG. 5.
WITNESSES:
INVENTOR
James Nelson Wood
BY
Attorneys

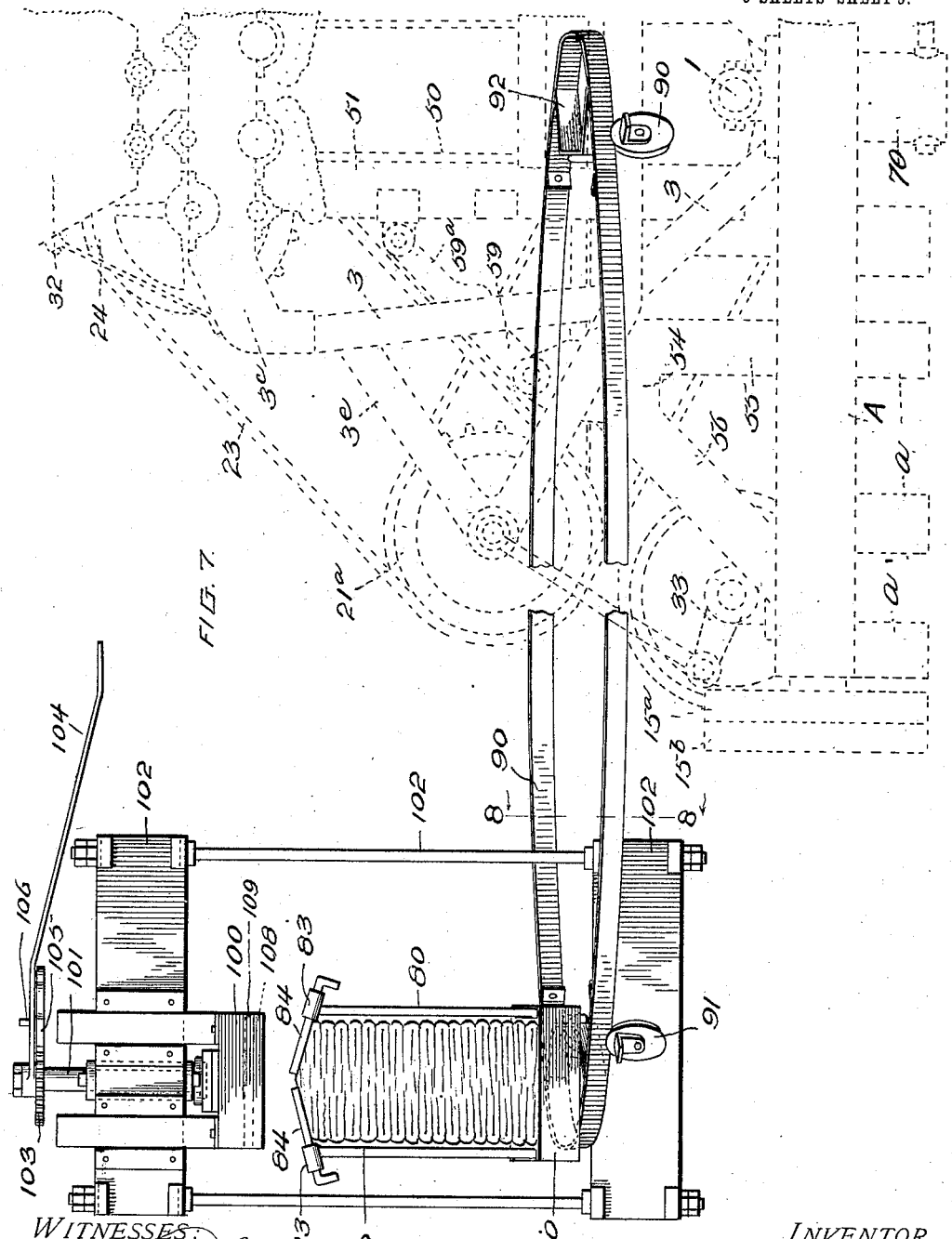

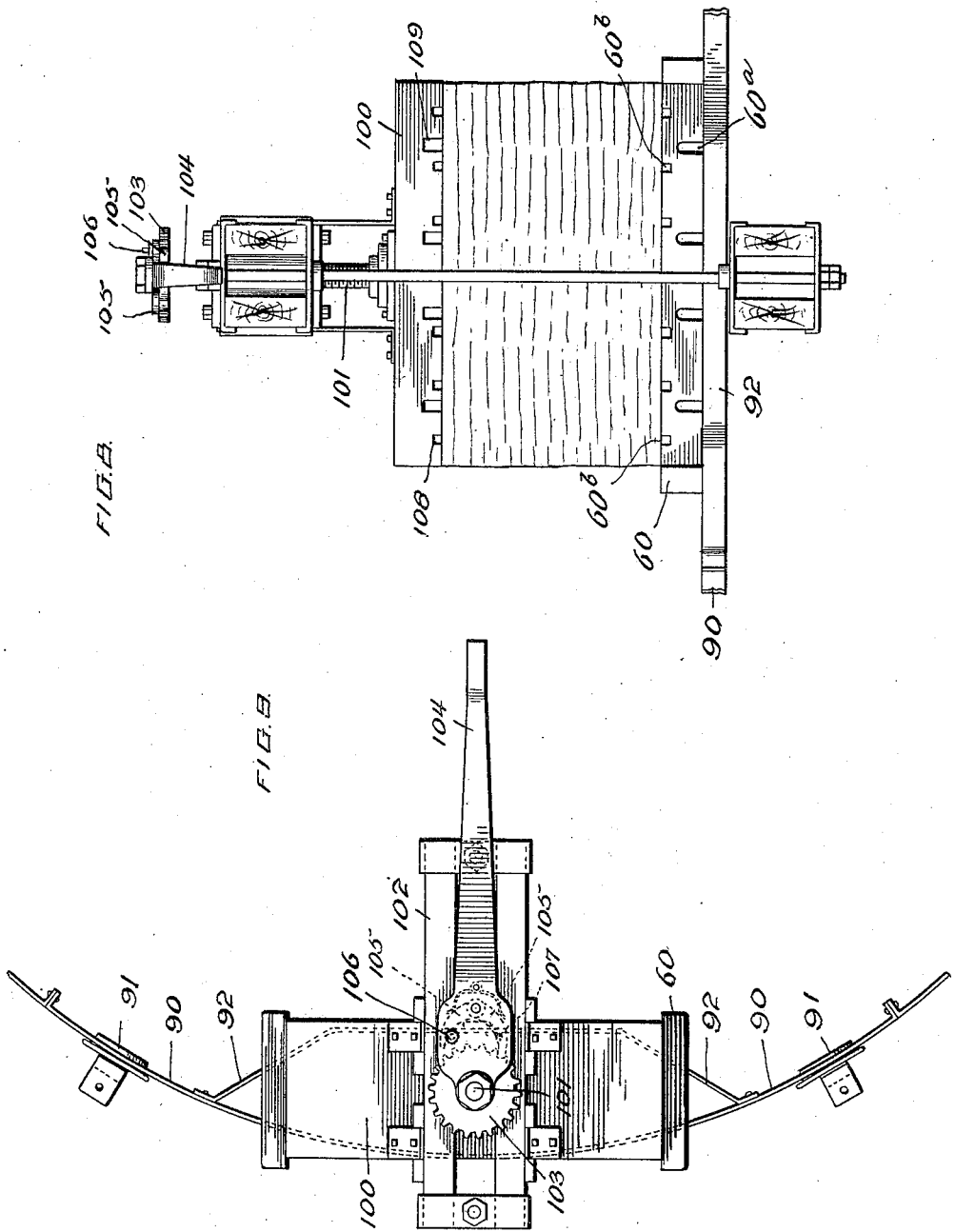

UNITED STATES PATENT OFFICE.

JAMES NELSON WOOD, OF BLACKSHEAR, GEORGIA, ASSIGNOR TO NEELY COMPRESS & COTTON COMPANY, OF RICHMOND, VIRGINIA, A CORPORATION OF VIRGINIA.

BALING-PRESS.

1,079,683.

Specification of Letters Patent.

Patented Nov. 25, 1913.

Application filed October 17, 1912. Serial No. 726,352.

*To all whom it may concern:*

Be it known that I, JAMES NELSON WOOD, a citizen of the United States, residing at Blackshear, in the county of Pierce and State of Georgia, have invented certain new and useful Improvements in Baling-Presses; and I do hereby declare the following to be a full, clear, and exact description of the invention, such as will enable others skilled in the art to which it appertains to make and use the same.

My invention consists in the novel features hereinafter described, reference being had to the accompanying drawings, which show one embodiment of the invention selected by me for purposes of illustration, and the said invention is fully disclosed in the following description and claims.

Referring to the said drawings Figure 1 represents a side elevation of a cotton baling press embodying my invention. Fig. 2 is an end view of the same. Fig. 3 is a transverse vertical sectional view. Fig. 4 is a vertical longitudinal sectional view of the press showing the bale partially completed and the oscillating baling frame tilted to the left. Fig. 5 is a similar view showing the baling frame located centrally, the bale completed and lowered away from the bale forming rollers. Fig. 6 is a bottom plan view of one of the pressure bars detached, illustrating the arrangement of the friction rolls carried thereby. Fig. 7 is a sectional view drawn to a smaller scale illustrating the arrangement of the press, with a turn table for removing the bales and carrying them to a device in which they are held while the bale ties or bands are applied. Fig. 8 is a vertical section on line 8—8 of Fig. 7. Fig. 9 is a top plan view of the bale applying press.

In the handling of the cotton staple it is customary to pack it into bales by means of such compressing mechanism as is available at the gins, which are usually located in rural inland districts and are without facilities for forming such a compact or dense bale as is required for foreign shipment of the staple, or for economic shipment generally. Such large loose bales are ordinarily shipped to the nearest point (usually at the seaboard) where a recompressing plant is located and the bales are there recompressed by huge hydraulic presses, under great pressure, to bring them to the size and density required for shipment aboard.

The object of my invention is to provide a cotton baling press of moderate size which can be installed at a comparatively small expense at the various cotton gins, and operated with a comparatively small expenditure of power, so that the cotton may be taken from the gin and immediately and finally compressed into a bale of the required or desired density for either foreign, or domestic shipment, thus avoiding the necessity for recompressing the bales at any time or for any purpose, and effecting a saving of the expense and delay incident to the recompressing of the bales, as required under the present system.

In the accompanying drawings I have illustrated an embodiment of my invention selected by me for purposes of illustration, in which a bale having a density of 30 pounds and above, per cubic foot, can be readily obtained, the construction of the apparatus being such that it can be economically erected and operated at ginning stations in the cotton raising districts throughout the country.

Referring to the accompanying drawings, A, A, represents the main supporting beams which support the apparatus, and which are preferably channel beams of iron or steel and preferably rest upon a plurality of sills, $a$, $a$, which are supported upon the ground or upon a suitable foundation of masonry or concrete. Between the channel beams A, A, are located a pair of I-beams B, B, supported upon the sills $a$, $a$, and upon these I-beams are supported a pair of short channel beams C, C, arranged a distance apart substantially equal to the exterior diameter of the hydraulic cylinder 70. These parts are bolted together and form a heavy and rigid framing for supporting the parts of the press. The cylinder 70 is provided with lateral supporting flanges, 74, adjacent to its upper end, which rest upon and are secured to the upper flanges of the beams, C, C, and the cylinder is provided with a plunger 72, the upper end of which is adapted to engage the vertically movable bottom of the bale box as hereinafter described, and the cylinder is provided with an outlet aperture, 73, at each side adjacent to the bottom to facilitate piping the motor fluid from either side of the apparatus. Obviously the aperture not so used will be plugged as indicated in Fig. 1.

On the front and rear sides of the piston the channel bars, A, A, are provided with clamp bearings, a' a' for receiving two alined sections, 1, 1, of heavy shafting which are clamped securely in said bearings, and preferably have their inner ends in engagement with supporting sockets carried by the beams C, C, (see Fig. 3). The shafts 1, 1, form the support for the oscillating baling frame which in this instance carries the bale forming rollers and pressure bars, the bale box containing the bale being held from lateral movement as hereinafter described.

The baling frame comprises preferably two side frames, each consisting of two heavy wrought iron uprights 3, 3, connected by a cross bar 3<sup>a</sup> and having their lower ends bent inwardly toward each other and secured to a heavy rocker casting 3<sup>b</sup> mounted pivotally on one of the supporting shafts. 1. The two side frames are connected by suitable cross bars and carry at their upper ends a horizontally disposed frame 3<sup>c</sup>, in which the baling rollers and adjacent devices are located. The side sections of the frame 3<sup>c</sup> are braced and united by cross bars 3<sup>d</sup> 3<sup>d</sup> circular in cross section, and held in place by two part (or capped) clamp bearings on the side sections, as shown, to facilitate assembling the parts, and the bearings for the rotating parts carried by the baling frame are also made in two parts (as split bearings) for the same reason and also to facilitate adjustment for wear.

The bale forming devices include a pair of baling rollers mounted on shafts 6, 6, supported in bearings in the frame 3<sup>c</sup> and a series of stationary presser bars 10, 10, extending laterally from each of said baling rollers. Each of said baling rollers consists of a plurality of disks, 5, keyed to their respective shafts and alternating with the pressure bars 10, 10. Each disk, 5, is provided with a major concentric face, 5<sup>a</sup> (which may be termed the peripheral compressing face) and which extends preferably less than half way around the axis of the disk, and a minor concentric face, 5<sup>b</sup>, at a less distance from the center, extending preferably more than half way around the axis of the disk, the major and minor faces being connected by inclined portions. The compressing face 5<sup>a</sup> of each disk is preferably slightly corrugated or provided with shallow indentations to prevent it from slipping on the face of the cotton bat, and the disks of each roller are secured rigidly to the roller shaft in registration. The shafts 6, 6, are connected by gearing with suitable driving means, in such relation that the rollers turn in opposite directions, and so that when the major faces of the disks of one roller engage the bale, the minor faces of the disks of the other roller will be adjacent to the bale, and vice versa. By this means the rollers fold and compress alternate layers of the bat upon the bale, and while either roller is operating on the bale the other roller will exert no friction on the upper surface of the bale, as would be the case if the rollers were provided with circular compressing faces.

The pressure bars 10, 10, alternating with the disks of each roller are each provided with a plurality of bale engaging rollers, 11, the lower faces of which extend slightly below the lower faces of the pressure bars, so as to contact with the upper face of the bale during its formation and retain the compression of the bat effected by the major or compression faces of the adjacent baling roller. In order to prevent the formation of waves or ridges in the cotton, I prefer to employ rollers, 11, of as large diameter as possible and to arrange them in staggered relation on opposite sides of each pressure bar, as shown in Fig. 6, thereby causing their lower faces to distribute the pressure as evenly as possible on the top of the bale and prevent the distortion of the top layer of the bat. I also support the pressure bars, 10, directly from the baling frame, independently of the shafts of the baling rollers, as clearly shown in the drawings, and to this end each of said cross bars is provided at its inner extremity with an upwardly extending hanger, 12, provided preferably with a split or separable clamp portion for engaging one of the cross bars 3<sup>d</sup>, and each presser bar is also provided at its outer extremity with a similar clamp engaging another of the cross bars 3<sup>d</sup>. The pressure bars, 10, thus extend around the roller shafts, 6, without touching them, so that the pressure on the pressure bars is transmitted directly to the baling frame, and thence to the supporting frame of the apparatus at the base of the same. It follows, therefore, that the baling rollers turn without pressure on their shafts or bearings, except during the period that their major or compressing faces are in engagement with the bale, thus reducing the amount of power required to actuate the baling rollers to a minimum. The major or compressing faces of the baling rollers also extend, when in engagement with the bale, slightly beyond the lower faces of the rollers, 11, of the pressure bars, 10, thus enabling the pressure bars to pass more easily over the top of the bale, while preventing any material expansion of the same, as lap after lap of the bat is folded and compressed thereon.

Power is applied to the baling rollers for rotating the same in any desired manner. In the drawing I have illustrated my preferred arrangement therefor but I do not desire to be limited to this arrangement. As shown, I provide a main driving shaft, 15, which is provided with fast and loose pulleys 15ª 15ᵇ to which a driving belt from any desired source of power, as a steam, explosive, or electric motor, or water wheel, may be applied. The shaft, 15, is provided with a worm 15ᶜ, engaging a worm wheel, 16, on a cross shaft, 17, the worm and worm wheel being inclosed in a casing 16ª filled with oil. The shaft, 17, is provided with a sprocket wheel, 17ª connected by a chain, 18, to one, (19,) of a pair of connected sprocket wheels, 19, 19ª, mounted loosely on one of the stationary shafts 1, and the other (19ª) of said sprocket wheels is connected by a chain, 20, with one (21) of a pair of connected sprocket wheels, 21, 21ª loosely mounted on a transverse shaft or bar, 36, secured to the oscillating baling frame, by brackets 3ᵉ, the other (21ª) of said wheels being connected by a chain, 23, to a sprocket wheel, 24, on a shaft 25 supported in the upper frame 3ᶜ of the baling frame, and provided with a gear, 26, which meshes with one of two intermeshing gears 27 and 28 on the shafts 6, of the baling rollers. By this means the rollers will be driven uniformly during the oscillations of the baling frame.

In order to secure the oscillation of the baling frame, the transverse shaft, 17, is provided adjacent to each end with a crank, 33, each crank being connected by a link, 37, with the transverse bar, 36, of the baling frame. Thus oscillating the baling frame in the proper timed relation with the revolutions of the baling rollers.

The cotton is fed in the form of a stream or bat to the baling rollers, and in order to guide it and feed it uniformly to the baling rollers, I prefer to provide the baling frame with a pair of feed rolls, 30, 30, the shafts of which are provided with intermeshing gears 30ª 30ª one of which meshes with and is driven by the gear 26. I also prefer to provide a hopper, 32, on the baling frame above the feed rolls, 30, for guiding the cotton thereto.

Owing to the very high pressure exerted on the cotton during the formation of the bale, the lateral pressure of the cotton forming the bale, upon the baling chamber in which the bale is formed is very great. In carrying out my invention I provide special means for supporting this lateral pressure which is preferably transferred directly to the heavy base frame of the apparatus and so to the foundations. This feature is highly important in securing the results accomplished by my press, to wit, a bale density of 30 pounds or over per cubic foot.

The baling chamber is stationary during the formation of the bale, and comprises two pivotally mounted vertically disposed lateral walls, 50, 50, and a vertically movable bottom, 60. The lateral walls of the baling chamber are secured to heavy vertically disposed bars or timbers, 51, the lower ends of which are preferably bolted to hinge castings 52, pivotally mounted on the horizontal pivotal shafts 1, 1, on opposite sides of the cylinder, and said sides are braced by heavy horizontally disposed timbers, 53, as shown. At each side of the press are located heavy abutments 54, 54, supported by vertical timbers or supports, 55, and inclined timbers or braces, 56, both of which extend down to and are securely bolted to the sills, a a, resting upon the ground or the masonry or concrete foundation. On each of the abutments 54, are bearings, 57, in which are mounted heavy shafts, 58, supporting the lower ends of massive toggle levers, the upper ends of which are pivotally secured to the sides, 50, 50, of the baling chamber. Each of said toggle levers comprises a member, 59, rigidly secured to the rock shaft, 58, and an upper member, 59ª pivotally connected to the upper end of the member, 59, and having its upper end pivotally connected to a shaft, 61, mounted in bearings secured to one of the horizontal braces, 53, of the adjacent side, 50, of the baling chamber. The pivotal connection, 62, between the links or members of each toggle is located on the inside of a line connecting the axes of the shafts, 58 and 61, when the toggle lever is straightened out, as shown in Fig. 1 and the members 59 and 59ª are provided adjacent to the pivotal connection with abutting shoulders, 63, 63, which hold the members in alinement, hence there is no tendency of the toggle joints to break outwardly and when in the position shown in Fig. 1, in which the side walls, 50, of the baling chamber are in closed position, the lateral pressure on the side walls will be transmitted directly to the abutments, 54, and thence to the foundations upon which the apparatus rests, thus relieving the baling mechanism of this strain. I also provide means for quickly and easily "breaking" the toggle joints, to release the pivoted side walls, 50, and permit them to be swung outwardly to release the bale after it has been completely formed. In the present instance I have shown one of the rock shafts provided with an operating lever, 64, for rocking the same, to throw the upper end of the connected toggle member, 59, outward, and in order to enable both toggles to be operated by a single lever, I prefer to provide the rock shaft, 58, to which lever, 64, is connected, with an arm, 65, to which is connected a bar, 66, extending across the press and having its other end curved upward and pivotally connected to an arm 65ª secured to the shaft 58 of the other toggle, so that both side walls of the baling chamber may be released and thrown back, or moved into closed position and locked by the toggles, by the operation of a single lever, 64.

In order that the press may be kept in operation practically continuously, I provide means, hereinafter described, for securing the bale after it is formed in the baling chamber, and the bale is removed from the press to another station or position where the bale bands or ties are applied, so that the press can be used immediately for the formation of another bale. To facilitate the removal of the bale, I preferably provide a circular turn table, supported above the baling floor F, which consists in this instance of a circular frame, 90, mounted upon suitable rollers, 91, arranged in circular form, said frame being provided with two horizontal platforms, 92, for supporting each a bottom plate, 60, and so arranged that said bottom plates will be brought successively between the side walls, 50, 50, of the press. The turn table may be given a half revolution by power or by hand in any suitable manner, when desired, to remove the completed bale from the press and carry it to a position beneath a bale tie affixing press, hereinafter described, and simultaneously bringing the other bottom plate, 60, into position to have the next bale formed thereon. Obviously the platforms 92, are open in the center to permit of the passage of the hydraulic piston therethrough.

Suitable means are provided for holding the bale under compression after it is formed until the bale bands or ties can be applied. For this purpose I prefer to employ the devices herein shown, which are constructed and operate as follows, particular reference being had to Figs. 3 and 5. The sides, 50, of the baling chamber are provided with a plurality of vertically disposed slots or recesses, 81, which register with horizontally disposed slots 60ª formed in the bottom sections 60 and extending to the bottom thereof. I employ a plurality of vertically disposed securing bars, 80, on each side of the bale, which, during the formation of the bale, lie in the recesses, 81, of the side pieces, 50, said bars having their lower ends provided with inwardly extending arms, 82, adapted to engage the slots in the bottom, 60, and having at their upper ends horizontally disposed guiding sleeves, 83, to receive laterally sliding retaining bars, 84.

In the operation of the press to form a bale, the pivoted sides 50, 50, of the baling chamber, are moved into vertical position and locked by swinging the toggles into the position shown in Fig. 1, one of the bottom sections, 60, having been previously brought into position between the sides 50 of the baling chamber. Motor fluid is now admitted to the cylinder, 70, at a pressure sufficient to overcome the weight of the plunger and the bottom, 60, thereby raising the plunger 72, which engages the bottom, 60, and moves it vertically between the side walls of the baling chamber to a point beneath the baling rollers and pressure bars. The press is then started by throwing the driving belt on to the fast pulley, 15ª thereby oscillating the baling frame and causing the cotton to be laid in folds or laps upon the bottom, 60. The admission of motor fluid to the cylinder is cut off and as the cotton is folded and compressed upon the bottom, 60, against pressure of the plunger, 72, the pressure in the cylinder rapidly rises until it reaches the desired point, when an automatic relief valve (not shown) will open and discharge the motor fluid gradually, maintaining the pressure on the bale for which it is set during the formation of the bale. As before stated each lap or layer of the bale is compressed upon the body of the bale by the major or compressing faces of the baling rollers, and the pressure is maintained by the pressure rollers of the pressure bars, as the baling frame carrying the baling rollers and pressure bars is oscillated. In Fig. 4 I have shown the bale partially formed. As soon as the bale is formed completely the operator will thrust forward the securing bars, 80, until their lower hook arms enter the slots in the bottom and engage the upper faces of said slots, and will then slide inwardly the retaining bars, 84, while the bale is still held between the plunger, 72, and the bale forming devices. After the bale has been thus secured to the bottom, 60, the plunger, 72, is lowered by releasing the motor fluid, and the bale is allowed to descend until the bottom, 60, rests upon the platform of the turn table. The lever, 64, is then operated to swing out the sides 50, 50, of the baling chamber and the turn table is then revolved to carry the finished bale to a position beneath the platen of the band applying press, and to bring the other bottom, 60, between the pivoted side walls 50, 50, of the baling chamber when the operation of the baling press may be immediately repeated, to form another bale.

The completed bale is carried beneath a bale applying press which comprises a block, 100, carried by a compression screw, 101, mounted in a threaded aperture in a suitable frame, 102. The screw is provided with suitable mechanism for turning the same, consisting, in this instance, of a spur wheel, 103, secured to the screw and an operating lever, 104, loosely engaging the screw and provided with oppositely disposed pawls, 105, normally pressed into engagement with the spur wheel, one of said pawls being held out of engagement with the wheel by a removable pin 106 engaging one of two apertures, 107, in the lever, according to the direction of rotation of the screw which is desired. The upper faces of the bottom plates, 60, are each provided with a plurality of transverse recesses 60<sup>b</sup> for enabling the bale bands to be passed around the bale, and the block, 100, has its lower face provided with bale band recesses, 108, and also with deeper recesses, 109, to accommodate the retaining bars. The recesses, 109, may also serve as bale band recesses where they aline with the recesses in the bottom 60. To remove the bale from the bale retaining devices the block, 100, is screwed down on top of the bale, the retaining bars, 84, entering the recesses, 109, in the block, until the said bars are relieved from pressure, the bars, 84, are then withdrawn laterally and the securing bars, 80, are removed. The bale ties or bands are then placed around the bale in the usual manner and secured. If the bale is to be covered with burlap, a piece of the same of sufficient size to cover the bottom and sides is placed in the baling chamber before the bale is formed, with its central portion on the bottom, 60. A second piece of burlap is placed over the bale before the block, 100, is lowered upon it, and after removing the bale retaining devices the end portions of the two pieces are overlapped and the whole held in place by the bands, additional pieces being secured in place over the ends of the bale to completely protect it from dirt, etc.

The means for holding the bale under compression after it is formed are not herein claimed, the same being reserved to form the subject matter of another application for patent to be filed hereafter.

It is to be noted that my improved press does not fold the bat into a bale to be subsequently compressed but on the contrary the bale is compressed to the density required, in the press and simultaneously with the formation of the bale, each layer being forcibly compressed and compacted upon the bale to the required density as it is laid on, so that during its entire formation and at the various stages thereof the required density of a finished bale is obtained and retained.

It is also to be noted that my compressing mechanism combines the functions of rollers and plungers the major faces of the rolls and the rollers of the pressure bars performing the rolling action in conjunction with the oscillating bale box and the major faces of the rolls themselves performing the added function of positively pressing the cotton by forcing it down against the bale and bale supporting means, and beyond the plane of the lowest portions of the rolls of the pressure bars, thus exerting a direct and powerful thrust which supplements the rolling action and assists in securing the required density.

What I claim and desire to secure by Letters Patent is:

1. In a baling press the combination with the baling rollers comprising spaced bale engaging sections, of pressure devices interposed between the sections of said rollers, and supported independently of the shafts of said rollers.

2. In a baling press the combination with a pair of baling rollers each having major and minor peripheral faces, of pressure bars provided with bale engaging faces extending horizontally from each of said rollers, and supported independently of the shafts of said rollers.

3. In a baling press the combination with a pair of baling rollers, each comprising spaced sections provided with major and minor peripheral surfaces, of a series of pressure bars adjacent to each of said rollers, having horizontally disposed bale engaging portions, and interposed between certain of said spaced sections of the roller, and means for supporting said pressure bars independently of the shafts of said rollers.

4. In a baling press the combination, with a pair of baling rollers each comprising spaced sections provided with major and minor peripheral surfaces, of a series of pressure bars adjacent to each roller having substantially horizontally disposed bale engaging faces, and interposed between certain of said spaced sections of the roller, the major peripheral portions of each roller extending slightly beyond the bale engaging faces of the adjacent pressure bars in a direction toward the bale.

5. In a baling press the combination with a pair of baling rollers each comprising spaced sections provided with major and minor peripheral surfaces, of a series of pressure bars adjacent to each roller having substantially horizontal bale engaging portions provided with staggered anti-friction rollers for engaging the bale, whereby the formation of waves in the successive layers of the bale is avoided.

6. In a baling press the combination with a pair of baling rollers each comprising spaced sections provided with major and minor peripheral surfaces, of a series of pressure bars adjacent to each roller having substantially horizontal bale engaging portions, anti-friction rollers on both sides of said pressure bars, the axes of the rollers on one side being located between the axes of the rollers on the other side.

7. In a baling press the combination with a supporting frame work, and a stationary baling chamber, of an oscillating baling frame pivotally mounted on said framework, a pair of baling rollers carried in said baling frame, and comprising spaced sections, pressure bars, directly connected to said baling frame independently of the shafts of said rollers, located between sections of the rollers, and provided with horizontally disposed bale engaging faces, whereby the pressure on said pressure bars is transmitted directly to the supporting framework independently of said roller shafts.

8. In a baling press the combination with bale forming devices, of a baling chamber provided with pivotally supported lateral walls, and toggle levers for supporting said walls in operative position, an operating lever connected with a member of one of said toggle levers, and a connection from said lever to the other toggle lever.

9. In a baling press the combination with bale forming devices, of a baling chamber provided with pivotally supported lateral walls, and toggle levers for supporting said walls in operative position, each of said levers comprising a rock shaft, a member supported thereon, and a second member pivotally connected to the first member and to one of said side walls, an operating lever secured to one of said rock shafts, and a connection from said lever to the other toggle lever adjacent to the pivotal connection between the members thereof.

10. The combination with bale forming devices, of a baling chamber provided with vertically disposed pivotally mounted walls, a toggle lever operatively connected with each of said walls for holding them in operative position, each comprising a rock shaft, a toggle member connected therewith, a second toggle member pivoted to the first member and to one of said walls, said members of each toggle lever having abutting shoulders, and having the axis of the pivotal connection between said members at one side of a line connecting the axis of the rock shaft, and the axis of the pivotal connection of said second member with the side wall, a lever connected with one of said rock shafts, and a bar connecting said lever with the other toggle lever at a point adjacent to the pivotal connection between the toggle members thereof.

11. In a baling press the combination with a horizontally disposed supporting framing, a hydraulic cylinder supported thereby in a vertical position, horizontal pivot supports supported by said framing on opposite sides of said cylinder, a baling chamber located above said cylinder and having vertical side walls pivotally secured to said pivotal supports, an oscillating baling frame mounted on said pivotal supports, and having its upper portion extending above the baling chamber, bale forming devices mounted in said baling frame above the baling chamber, inclined supports for holding the side walls of the baling chamber in operative position, extending from said walls to the said supporting framing, a removable vertically movable bottom in the baling chamber, above said cylinder, and a plunger in said cylinder beneath said movable bottom.

12. In a baling press the combination with a stationary baling chamber, provided with pivotally mounted lateral walls and movable means for holding said walls in operative position, of a rotatable frame having a portion lying between the lateral walls of said baling chamber, a vertically movable bottom for the said chamber supported when not in use on said rotatable frame, a pressure device having a vertically movable part located below said rotatable frame, between the planes of the side walls of the baling chamber for elevating said bottom, bale forming devices located above said baling chamber and cooperating with said pressure device to form a bale in said chamber, whereby the completed bale may be removed from the press by releasing said pivoted side walls and operating said rotatable frame.

13. In a baling press, the combination with bale forming devices, of a baling chamber provided with lateral walls pivotally supported adjacent to one end of the same, toggle levers located on opposite sides of said chamber for operating said pivoted walls, each comprising a pivoted supporting member and a member pivoted to said first mentioned member and to the adjacent side wall, an operating arm connected to the supporting member of each toggle lever, a connecting bar extending from one side of the baling chamber to the other and connecting said operating arms, and an actuating lever operatively connected to said toggle levers for actuating the same.

14. In a baling press, the combination with an oscillating baling frame pivotally mounted at its lower end, and bale forming rollers, and pressure retaining devices carried thereby, of a bale forming chamber below said bale forming devices, provided with side walls pivoted concentrically with said baling frame, a vertically movable bottom for said baling chamber, a pressure cylinder, a piston in said cylinder for operating said bottom and devices arranged on opposite sides of said baling chamber, mounted at points above the pivotal supports for the side walls and baling frame, and pivotally connected to said side walls adjacent to the upper ends of the same, for locking them in closed position.

15. In a baling press, the combination with the oscillating baling frame, a pair of alined pivot shafts supporting the lower end of said frame and bale forming devices comprising bale forming rollers and pressure retaining devices carried by the upper portion of said frame, of a bale forming chamber provided with lateral walls pivotally mounted on said pivot shafts, below said chamber, a vertically movable bottom for said chamber, a cylinder mounted between the alined pivot shafts, a piston in said cylinder for operating said movable bottom, and means for moving said lateral walls into and out of operative position, and for holding them in operative position, connected to said walls adjacent to the upper ends of the same.

16. In a baling press, the combination with the oscillating baling frame, a pair of alined pivot shafts supporting the lower end of said frame, and bale forming devices comprising bale forming rollers and pressure retaining devices carried by the upper portions of said frame, of a bale forming chamber provided with lateral walls pivotally mounted on said pivot shafts, below said chamber, a vertically movable bottom for said chamber, a cylinder mounted between the alined pivot shafts, a piston in said cylinder for operating said movable bottom, and means for moving said lateral walls into and out of operative position, and for holding them in operative position, connected to said walls adjacent to the upper ends of the same, driving mechanism mounted on a stationary part adjacent to the lower end of the baling frame, and connections between said driving mechanism and the baling rollers, for driving the same while permitting the oscillation of said frame, and connections between said driving mechanism and said baling frame for oscillating the same.

In testimony whereof I affix my signature, in the presence of two witnesses.

JAMES NELSON WOOD.

Witnesses:
J. B. TRUETT,
H. DANIEL.

Copies of this patent may be obtained for five cents each, by addressing the "Commissioner of Patents. Washington, D. C."